United States Patent [19]

Treat

[11] Patent Number: 5,203,591

[45] Date of Patent: Apr. 20, 1993

[54] MULTICODE BARCODE LABEL

[75] Inventor: Douglas H. Treat, Concord, N.H.

[73] Assignee: Computype, Inc., St. Paul, Minn.

[21] Appl. No.: 952,052

[22] Filed: Sep. 28, 1992

[51] Int. Cl.[5] .............................................. B42D 15/10
[52] U.S. Cl. ...................................... 283/81; 235/494
[58] Field of Search .......................... 283/81; 235/494

[56] References Cited

U.S. PATENT DOCUMENTS 3,211,470  10/1965  Wilson ................................. 283/81

Primary Examiner—Paul A. Bell
Assistant Examiner—Kenneth J. Hansen
Attorney, Agent, or Firm—Lee A. Strimbeck

[57] ABSTRACT

A barcode label comprises a carrier surface, such as a reflective surface on a paper sheet, having thereon a barcode in at least three or more different densities, each density having an optimum reading distance different from the others. The label is preferably pressure sensitive. Also, for certain applications, the label is curved to have or otherwise has an upper lip shading the barcode from overhead light.

7 Claims, 1 Drawing Sheet

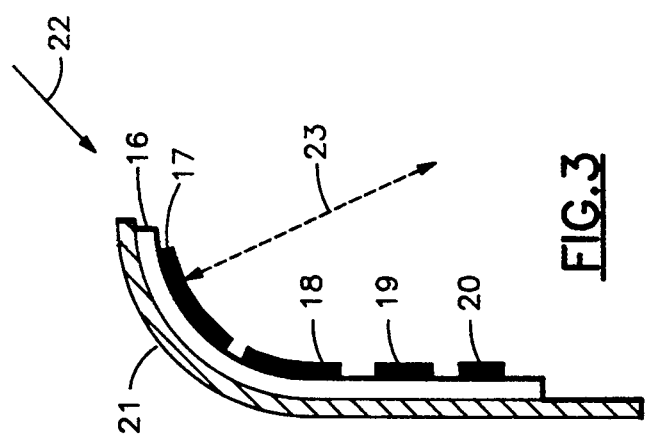
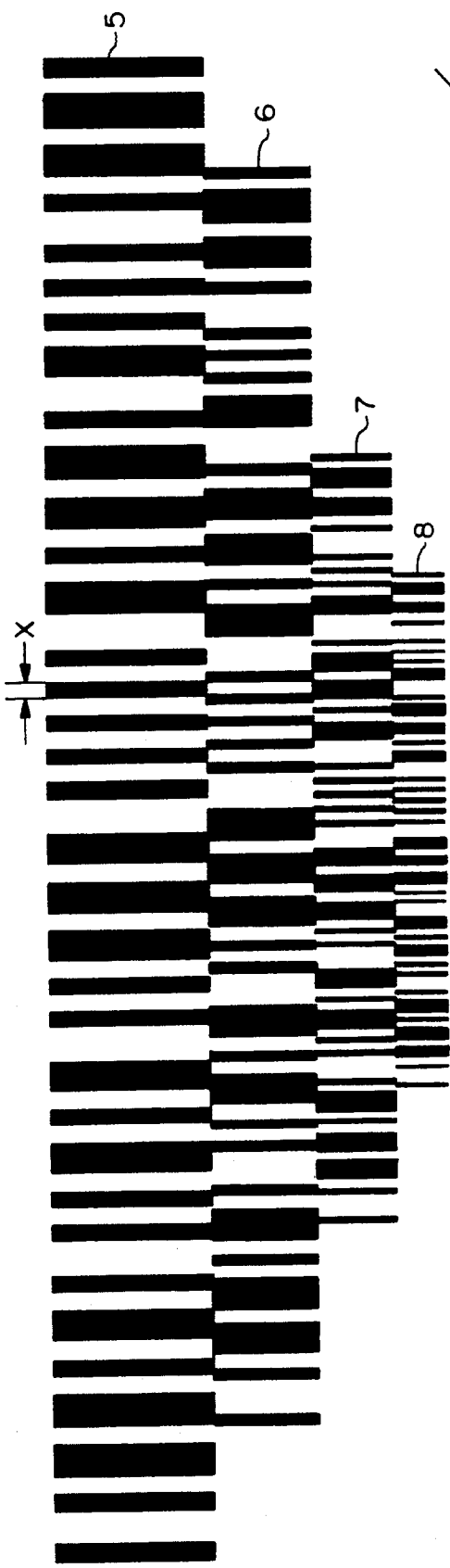

MULTICODE BARCODE LABEL

FIELD OF THE INVENTION

The present invention is a multicode barcode label. More particularly, this invention is a label having a single barcode displayed in at least three different densities, the optimum reading distances from each being different.

BACKGROUND OF THE INVENTION

The current method for reading barcode labels at a distance is to produce a barcode symbology with an X dimension (width of the narrow bar) which is suitable for the laser scanner to interpret. As an example, a Symbol Technology (Bohemia, New York) LS 3010 ALR laser scanner can read barcodes at varying distances depending upon the X dimension of the narrow bar of the symbology.

Where the distances from which a barcode must be read vary widely, it has been difficult to get a reading from a single line of barcode at all distances. In warehouse applications where labels are scanned at varying distances, for example, a bottom shelf at four feet and a top shelf at twenty-five feet, many different sized labels and symbology densities are required. To supply these as individual labels has provided to be costly and inflexible when a change in distance is required.

A scanner has some capability of reading the reflected light at varying distances from a scanning of a barcode but there is an optimum distance from each density of barcode. Typically, the correct X dimension at four feet is forty mils, at fifteen feet is seventy mils, at seventy feet is one hundred mils and twenty-five feet and up is one hundred fifty mils. However, until the present invention, the industry has not developed a method or procedure for providing a barcode having different scanning distances in a single label.

THIS INVENTION

The present invention is a barcode label comprising a carrier surface displaying thereon a single barcode in at least three different densities with each density having an optimum reading distance different from the others.

More particularly, the barcode label of this invention has three to four different densities of a single bar code stacked one upon another on a common center line. Preferably the height of each line of the barcode increases in proportion to the increase in the X dimension of the line of a barcode.

As is known, it is preferred that the carrier surface be a highly reflective surface, for example, one composed of reflective microspheres. In a preferred form, the label is a pressure sensitive label having the following layers:
A. printed bar code
B. transparent plastic film
C. adhesive layer
D. reflective substrate
E. pressure sensitive adhesive
F. release sheet or carrier film.

Often a barcode has to be read in a warehouse with high intensity overhead lighting or it must be read outside in direct sunlight. Laser scanners project a sighting spot to shown that the operator is focussing on the barcode label. The high intensity light or the sunlight hitting the reflective surface of the barcode may obscure his ability to see the target locating spot. In this connection, in a preferred embodiment of the invention, the barcode label is curved or is made concave about the barcodes such that it has an upper lip that shields or shades the barcode from overhead light. Also, the curved surface can aid in a more precise return of the scanning beam to the reader. It is only necessary for the laser scanner to read a very narrow line over the width of one of the barcode's densities and if that particular line is perpendicular to the line of sight of the scanner, it will be directly reflected back to the reader. This is particularly helpful in a warehouse where the top shelf may be twenty-five feet up. If the large density barcode is at the top curved portion of the label, it will improve the reading.

DRAWINGS

In the drawings:

FIG. 1 illustrates one embodiment of the multi-density barcode of this invention;

FIG. 2 is an enlarged cross sectional view of the bar code label along the longitudinal axis of the label; and FIG. 3 is a cross sectional view of the curved form of the barcode label taken along a line perpendicular to the longitudinal axis of the label.

DESCRIPTION

Referring to the drawings, shown in FIG. 1 is the multicode barcode label of this invention. It consists of a single barcode repeated in four different densities, each barcode stacked one on another about a common center line. The top large barcode 5 may, for example, be fourteen and three eighths inches long and the bottom small barcode may be four and five eighths inches long. The intermediate density barcodes 6 and 7 lie in length in between. The height of each barcode can be roughly in proportion to the X dimension; i.e., the width of the narrowest bar, of each barcode. While the different barcodes could, in theory, be placed in any arrangement for ease of manufacture and reading, it is sufficient, as illustrated, if the barcodes are linearly aligned and placed reasonably vertically adjacent one another.

While the barcode label of this invention can be on ordinary card stock, it is usually provided in the form of a pressure sensitive label with an enhanced reflective background as shown in FIG. 2. In FIG. 2 the label consists of a series of layers, viz:
10—the barcode laid down as by printing
11—transparent plastic film
12—adhesive layer
13—reflective substrate of microspheres
14—adhesive layer
15—release sheet.

As illustrated in FIGS. 1 and 2, the barcodes are black and the background is reflective. This may be reversed such that the barcode symbology is reflective and the background is black in certain applications.

In FIG. 3 is shown a cross sectional side view of one form of the compound barcode label of this invention wherein it is curvilinear to permit better reading of the barcode and/or to have the curve of the label shield the barcode from overhead impinging light. As shown, a barcode label 16 is supported on a curved mounting bracket. 21. The barcode label has a single barcode repeated in four different densities 17, 18, 19 and 20. As can be seen, the overshadowing or overhanging portion 16 shadows the lines of the barcodes from overhead incident radiation such as sunlight as shown by arrow 22, thus, making it easier for the operator of the scanner to see the sighting light on each line of the barcode. Also, in the case of an overhead warehouse rack where the operator may be standing twenty or so feet below the barcode looking up at it, when the scanner reads line 17, for example, as shown by directional arrow 20, as the line of reading is perpendicular to the line of sight, the laser beam will be directly reflected back to the scanner.

What is claimed is:

1. A barcode label comprising a carrier surface displaying thereon a single barcode repeated in at least three different densities, said barcodes being arranged vertically adjacent one another wherein each barcode has an overall length and width different from said adjacent barcode thereby providing an optimum reading distance that is different from said adjacent barcode.

2. The barcode label of claim 1 wherein the barcodes are stacked one over another on a common center line and wherein the height of each barcode varies in proportion to the change of the X dimension of the bar code symbology in each barcode.

3. The barcode label of claim 2 wherein said carrier surface comprises a highly reflective surface composed of reflective microspheres.

4. The barcode label of claim 3 wherein said barcode label is a pressure sensitive label composed of the following layers:
 a) the barcode
 b) transparent film
 c) adhesive layer
 d) reflective support surface
 e) pressure sensitive adhesive
 f) release sheet.

5. The barcode label of claim 2 wherein said label is curved over said center line presenting a concave surface to the reader.

6. The barcode label of claim 2 wherein said label has an upper lip extending outwardly from said label when the label is mounted vertically, said upper lip shielding said barcodes from light coming from above.

7. The barcode label of claim 2 wherein there are four different densities of said single barcode, the X dimensions of the narrow bars thereof having a width approximately of forty, seventy, one hundred and one hundred fifty mils.

* * * * *